United States Patent

[11] 3,590,179

[72] Inventor John G. Pahl
 1624 C. Alpine Ave., Stockton, Calif. 95205
[21] Appl. No. 839,268
[22] Filed July 7, 1969
[45] Patented June 29, 1971

[54] POLE-MOUNTED DUAL SWITCH UNIT
 4 Claims, 4 Drawing Figs.
[52] U.S. Cl. .................................................. 200/48
[51] Int. Cl. ............................................ H01h 31/00
[50] Field of Search ........................................... 200/48;
 174/169

[56] References Cited
UNITED STATES PATENTS
3,222,470 12/1965 Pahl ............................ 200/48
FOREIGN PATENTS
452,649 3/1968 Switzerland .................. 200/48

Primary Examiner—Robert K. Schaefer
Assistant Examiner—H. J. Hohauser
Attorney—Webster & Webster ABSTRACT: A switch unit, of air-break disconnect type and which is adapted to be pole-mounted, comprising—in connection with a supporting structure—a pair of longitudinal insulators spaced apart at adjacent ends and projecting outward in opposite directions, a third longitudinal insulator extending laterally of said pair of insulators and projecting outward in a vertical plane therebetween, each insulator of the pair being mounted for part circle rotation about its axis, a switch formed between each rotatable insulator and the third insulator and such switch being opened or closed by part circle rotation of said insulator in one direction or the other, there being means connected to the rotatable insulators to selectively rotate the same, the outer end of each of the three insulators being adapted for coupling to a separate and corresponding circuit cable, and circuit means arranged with said circuit cables and switches in a manner such that, when the latter are closed, the circuit cable coupled to the pair of insulators are individually electrically connected to the circuit cable coupled to the third insulator.

PATENTED JUN29 1971

INVENTOR.
John G. Pahl

BY

Webster & Webster
ATTORNEYS

PATENTED JUN29 1971 3,590,179

POLE-MOUNTED DUAL SWITCH UNIT

BACKGROUND OF THE INVENTION

In pole-mounted switch units of air-break disconnect type, and wherein two circuit cables end-connect to insulators of the switch unit, a single switch is conventionally included and which is opened and closed—relative to said cables—by part circle rotation of one such insulator. In certain instances, however, it is desired to incorporate two switches in the switch unit whereby the latter can accommodate a third circuit cable, with the switches then providing certain selective electrical connections (or disconnections) relative to the three cables. It was in the direction of providing such a dual switch unit that the present invention was conceived.

SUMMARY OF THE INVENTION

The present invention provides, as a major object, a novel pole-mounted switch unit, of air-break disconnect type, which is designed for coupling to three separate, differentially extending circuit cables; the unit embodying dual switches—individually opened or closed by insulator rotation—operative to accomplish certain selective electrical connections (or disconnections) relative to such cables.

The present invention provides, as an additional object, a novel, pole-mounted switch unit, of air-break disconnect type, comprising—in connection with a supporting structure—a pair of longitudinal insulators spaced apart at adjacent ends and projecting outward in opposite directions, a third longitudinal insulator extending laterally of said pair of insulators and projecting outward in a vertical plane therebetween, each insulator of the pair being mounted for part circle rotation about its axis, a switch formed between each rotatable insulator and the third insulator and such switch being opened or closed by part circle rotation of said insulator in one direction or the other, there being means connected to the rotatable insulators to selectively rotate the same, the outer end of each of the three insulators being adapted for coupling to a separate and corresponding circuit cable, and circuit means arranged with said circuit cables and switches in a manner such that, when the latter are closed, the circuit cables coupled to the pair of insulators are individually electrically connected to the circuit cable coupled to the third insulator.

The present invention provides, as a further object, a pole-mounted dual switch unit which is designed for ease and economy of manufacture.

The present invention provides, as a still further object, a practical, reliable, and durable pole-mounted dual switch unit and one which is exceedingly effective for the purpose for which it is designed.

BRIEF DESCRIPTION OF THE DRAWINGS

FIG. 2 is a front elevation of the dual switch unit; one switch being closed and the other open.

FIG. 3 is an end elevation of the dual switch unit; both switches being open.

DESCRIPTION OF THE PREFERRED EMBODIMENT

Figure 1:
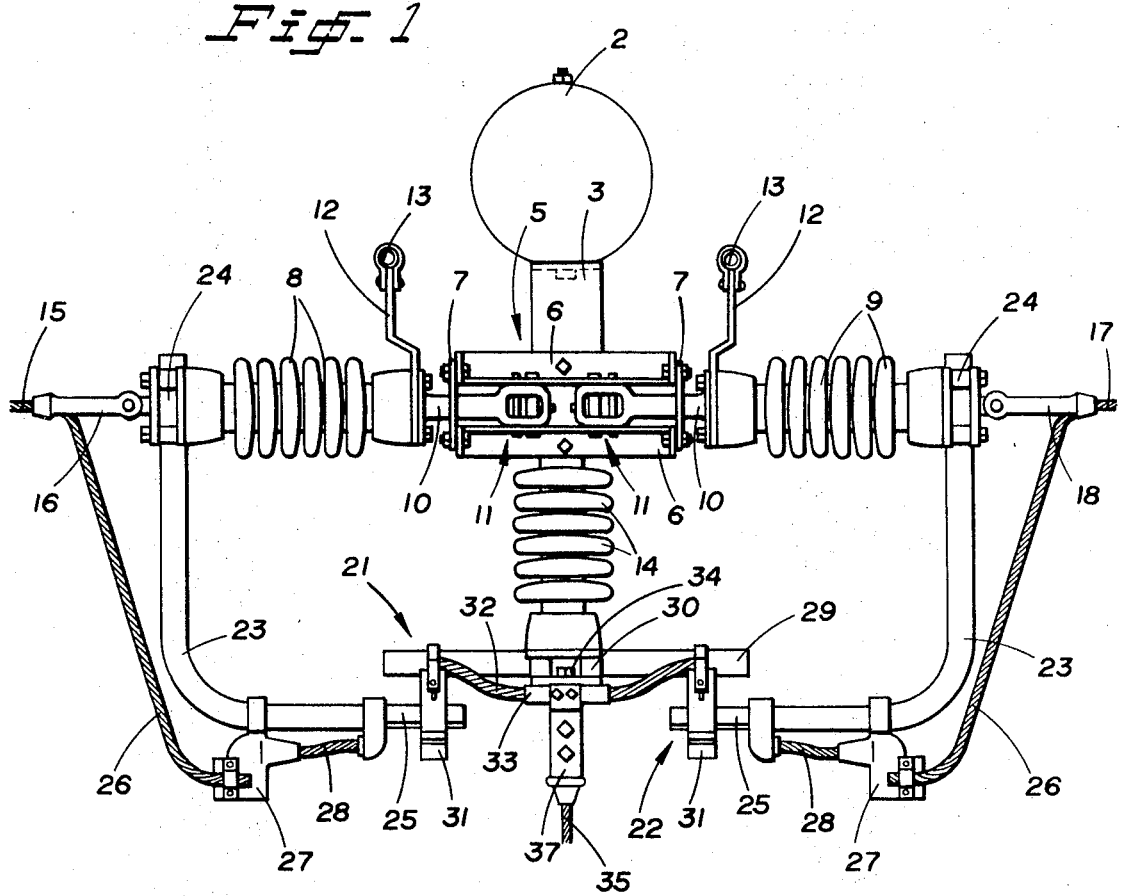
FIG. 1 is a top plan view of the dual switch unit as pole-mounted; both switches being closed.
Figure 4:
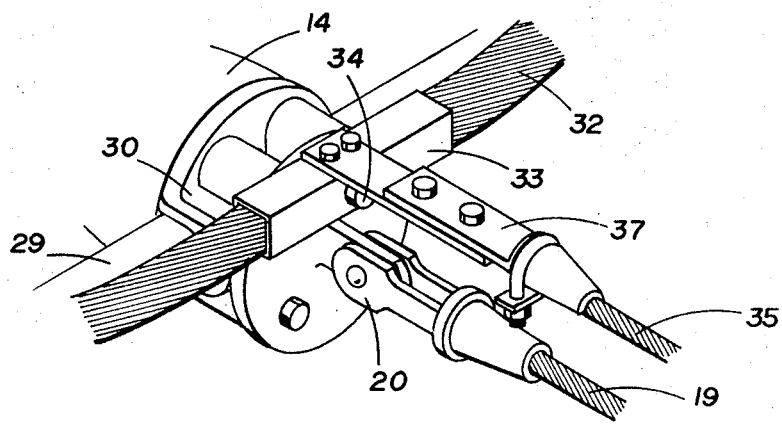
FIG. 4 is an enlarged, fragmentary isometric view showing mainly the double-ended bus cable and associated parts at the outer end of the laterally extending insulator.

Referring now more particularly to the drawings and to the characters of reference marked thereon, the pole-mounted dual switch unit of the present invention comprises a vertical bracket 1 secured to the face of a utility pole 2; such bracket being provided at its upper end with a horizontal outwardly projecting bracket plate 3, while a U-shaped base 4 extends outwardly from the bracket below such plate.

A supporting head, indicated generally at 5, is secured on and intersects the bracket plate 3; such head including laterally spaced angle members 6 connected by end plates 7.

2

A pair of longitudinal axially aligned insulators, indicated at 8 and 9, are disposed so that they project substantially horizontally outward from adjacent opposite ends of the supporting head 5. Each of the insulators 8 and 9 is provided with an inwardly extending axial shank 10 which passes in rotatable relation through the related end plate 7. Inwardly of such related end plate 7, each shank 10 is mounted in connection with the head 5 for limited rotation but held against axial displacement; each such mount (which is conventional) being indicated generally at 11. With this arrangement, each of the insulators 8 and 9 is held against axial displacement but can be rotated or turned to a limited extent. Part circle rotation of each insulator 8 and 9 is accomplished by means of a radial arm 12 fixed on the rear end of such insulator and extending inwardly therefrom to connection with a push-pull rod 13.

A third longitudinal insulator, indicated at 14, is fixed at its inner end on the base 4 and thence projects outwardly horizontally in a lateral direction relative to the insulators 8 and 9. As so mounted, the insulator 14 lies in the central transverse vertical plane of the switch unit.

At its outer end, the insulator 8 is connected to a circuit cable 15 by a coupling 16, while at its outer end the insulator 9 is connected to a circuit cable 17 by a coupling 18.

At its outer end, the third and laterally extending insulator 14 is connected to a circuit cable 19 by a coupling 20.

A separate switch is formed between the rotatable insulator 8 and the fixed insulator 14, and another separate switch is formed between the rotatable insulator 9 and said fixed insulator 14; such switches (in FIG. 1 only) being indicated generally at 21 and 22, respectively. As the switches 21 and 22 are—except for being right- and left-hand—of the same construction, a description of one will suffice for both.

Each of the switches 21 and 22 includes an L-shaped or doglegged switch arm 23 secured at its inner end by a clamp 24 to the outer end of the related insulator 8 or 9; such switch arm radiating from said insulator with the outer end portion of the arm turned or extending inwardly toward but terminating short of the central vertical transverse plane of the switch unit.

Adjacent its free end, the switch arm 23 is fitted with a male switch blade 25 having electrical connection with the corresponding circuit cable 15 or 17 by means of a lead 26, a connector 27, and a bus cable 28.

A horizontal crossbar 29 is positioned at the outer end of the lateral or third insulator 14, and centrally of its ends such crossbar 29 is fixed to said insulator by a clamp 30. As so mounted, opposite end portions of the crossbar 29 extend radially of insulator 14 generally in the directions of the corresponding switch arms 23.

Each end portion of said crossbar 29 provides the support for an upstanding fixedly secured female switch member 31 disposed in a position for mating engagement by the male switch blade 25 on the corresponding switch arm 23 when the latter is swung to a forwardly extending position by limited or part circle rotation of the related rotatable insulator 8 or 9. See FIG. 1.

A double-ended bus cable 32 spans between and is electrically connected to the female switch members 31, and intermediate its ends such double-ended bus cable includes thereon a mounting and electrical conductor member in the form of a press-fitted box sleeve 33 which lies across and is bolted, as at 34, to the outer end of the clamp 30.

The circuit cable 19 is electrically connected to the double-ended bus cable 32 by a lead 35 clamped at one end, as at 36, to said circuit cable 19, and at the other end being attached to the box sleeve 33 by a flat strip connector 37.

With the switch unit constructed as described, and with the switches 21 and 22 closed as in FIG. 1, circuit cables 15 and 17 are both in electrically connected relation to the circuit cable 19.

Figures 2, 3:
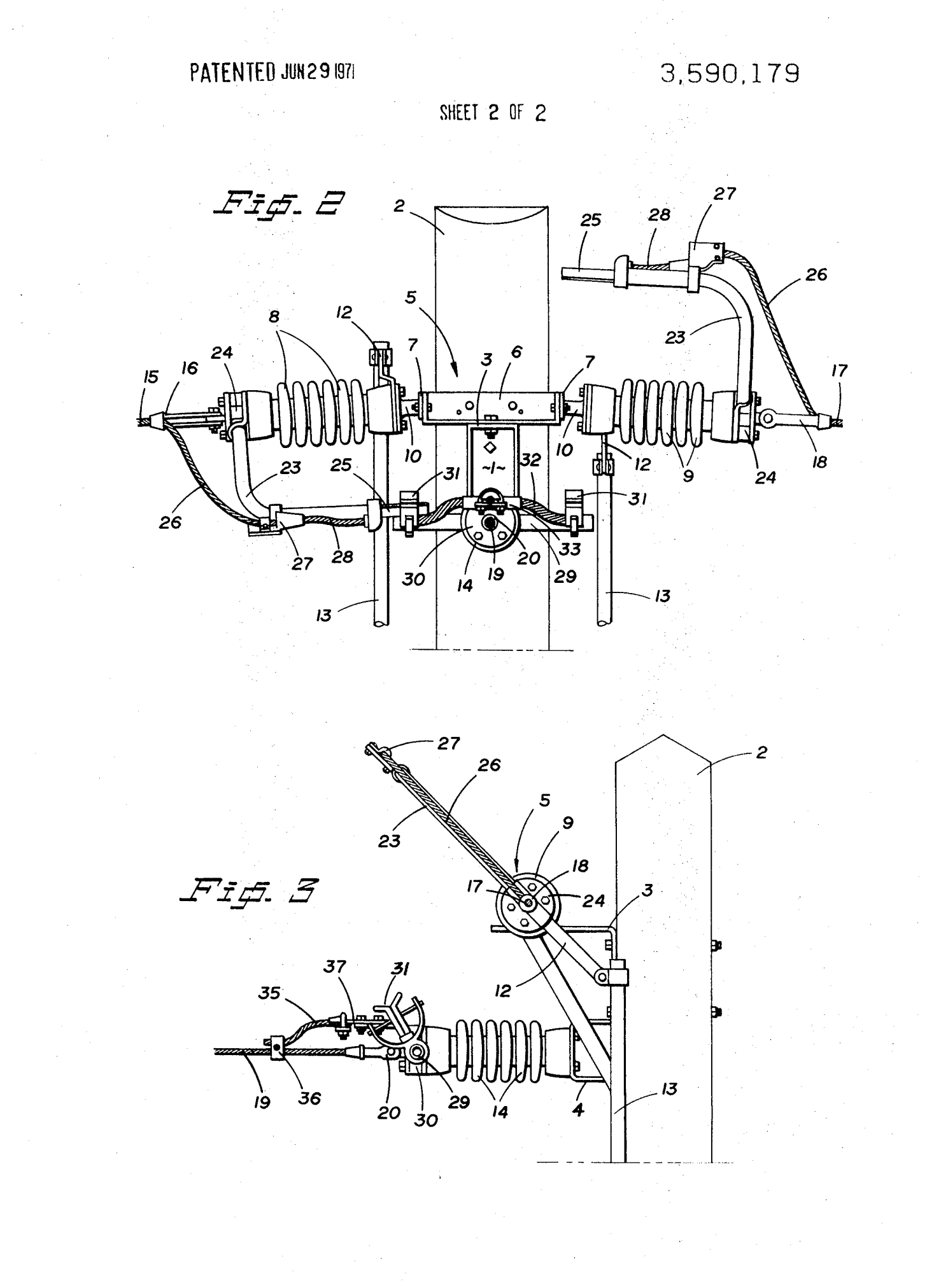

However, by opening only switch 22, the circuit cable 17 is placed in disconnected relation to circuit cables 15 and 19, which latter cables remain in electrically connected relation. See FIG. 2. The converse is true if switch 21 is alone opened, and in this instance circuit cable 15 is placed in disconnected relation to circuit cables 17 and 19, which latter cables remain in electrically connected relation.

Further, upon opening of both switches 21 and 22, the switch unit stands fully open, and the circuit cables 15, 17, and 19 are in disconnected relation, each to the others.

Thus, the present invention provides a practical and readily operative switch unit whrein—by manipulation of the dual switches—the three circuit cables can be placed in such selective electrical connection, or wholly disconnected from each other as conditions may require.

From the foregoing description, it will be readily seen that there has been produced such a pole-mounted dual switch unit as substantially fulfills the objects of the invention, as set forth herein.

I claim:

1. In a pole-mounted switch unit, of air-break disconnect type, which includes a supporting structure secured to the pole, a pair of generally opposed longitudinal insulators connected at their inner ends to the supporting structure and each adapted for limited rotation, a third longitudinal insulator connected at its inner end to the supporting structure in fixed relation intermediate said pair of insulators, the outer end of each of the three insulators being adapted for coupling to a separate and corresponding circuit cable, an arm radiating from each rotatable insulator, a first switch part on the outer portion of each arm, a crossbar fixed intermediate its ends on the outer end of the third insulator, a second switch part on each end portion of the crossbar, corresponding first and second switch parts comprising a switch closed by engagement of said corresponding parts when the related rotatable insulator is in a predetermined rotative position, and electrical connection means arranged with said circuit cables and switches in a manner such that, when the latter are closed, the circuit cables coupled to the rotatable insulators are individually electrically connected to the circuit cable connected to said third insulator; the improvement characterized by said electrical connection means including a double-ended bus cable extending between and connected to said second switch parts on the end portions of the crossbar, and a mounting and electrical conductor member fixed on the bus cable intermediate its ends; the circuit cable coupled to the third insulator having electrical connection with said member on the bus cable.

2. A switch unit, as in claim 1, in which said member on the double-ended bus cable comprises a sleeve fixed thereon intermediate its ends, and means securing the sleeve to the outer end of said third insulator.

3. A switch unit, as in claim 2, in which the crossbar is fixed on the outer end of said third insulator by a clamp; the sleeve of the double-ended bus cable spanning said clamp, and said securing means including the clamp and a bolt securing the sleeve thereto.

4. A switch unit, as in claim 3, in which the sleeve is of press-fitted box type; the clamp and said sleeve having flat, abutting faces.